United States Patent
Shintai et al.

(10) Patent No.: US 7,463,895 B2
(45) Date of Patent: Dec. 9, 2008

(54) RADIO COMMUNICATION TERMINAL UNIT AND METHOD OF TRANSMITTING BASE STATION IDENTIFICATION NUMBER

(75) Inventors: Tatsuya Shintai, Chita-gun (JP); Atsushi Hayashida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/389,100

(22) Filed: Mar. 27, 2006

(65) Prior Publication Data

US 2006/0166680 A1    Jul. 27, 2006

Related U.S. Application Data

(62) Division of application No. 10/189,433, filed on Jul. 8, 2002, now Pat. No. 7,047,024.

(51) Int. Cl.
*H04Q 7/20* (2006.01)
(52) U.S. Cl. ............. 455/456.1; 455/456.5; 455/456.6; 455/457; 455/561
(58) Field of Classification Search ............. 455/456.1, 455/456.5, 456.6, 457, 561, 467
See application file for complete search history.

(56) References Cited

U.S. PATENT DOCUMENTS

| | | | |
|---|---|---|---|
| 5,485,163 A * | 1/1996 | Singer et al. ................. 342/457 |
| 5,570,412 A | 10/1996 | LeBlanc | |
| 5,903,844 A | 5/1999 | Bruckert et al. | |
| 6,021,330 A | 2/2000 | Vannucci | |
| 6,185,421 B1 | 2/2001 | Alperovich et al. | |
| 6,259,923 B1 | 7/2001 | Lim et al. | |
| 6,266,533 B1 * | 7/2001 | Zadeh et al. ............. 455/456.2 |
| 6,295,455 B1 | 9/2001 | Fischer et al. | |
| 6,771,970 B1 * | 8/2004 | Dan ........................ 455/456.1 |
| 2001/0044310 A1 | 11/2001 | Lincke | |
| 2002/0022452 A1 | 2/2002 | Toya | |
| 2002/0077124 A1 | 6/2002 | Hunzinger | |
| 2003/0011513 A1 * | 1/2003 | Zhao et al. ............. 342/357.09 |
| 2003/0022674 A1 | 1/2003 | Shintai et al. | |
| 2004/0072576 A1 * | 4/2004 | Nuutinen et al. ......... 455/456.1 |
| 2004/0156372 A1 * | 8/2004 | Hussa ........................ 370/401 |

FOREIGN PATENT DOCUMENTS

| CN | 02127073.2 | 7/2002 |
|---|---|---|
| JP | A 11-239381 | 8/1999 |

* cited by examiner

*Primary Examiner*—Duc Nguyen
*Assistant Examiner*—Julio R Perez
(74) *Attorney, Agent, or Firm*—Oliff & Berridge, PLC (57) ABSTRACT

A method of transmitting a base station identification number including, upon turning from a standby mode to a data communication mode, responding to a user's instruction of location positioning to turn from the data communication mode to the dormant mode; receiving base station identification numbers from several base stations through a paging channel; and designating one of the base stations with the received identification numbers as the base station of primary communication with the phone unit. The method can further include sending the identification number of the proper base station of primary communication to a location information server even in case the phone unit is instructed by the user to commence the location positioning after it has moved from the location where it had commenced the data communication.

4 Claims, 9 Drawing Sheets

RADIO COMMUNICATION TERMINAL UNIT AND METHOD OF TRANSMITTING BASE STATION IDENTIFICATION NUMBER

This is a Divisional of application Ser. No. 10/189,433 filed Jul. 8, 2002. The entire disclosure of the prior application is hereby incorporated by reference in its entirety.

CROSS REFERENCE TO RELATED APPLICATION

This application is based on and incorporates herein by reference Japanese Patent Application No. 2001-225964 filed Jul. 26, 2001.

FIELD OF THE INVENTION

The present invention relates to a radio communication terminal unit which is designed to receive base station identification (ID) numbers from base stations through the paging channel, and a method of transmitting a base station ID number from the radio communication terminal unit.

BACKGROUND OF THE INVENTION

Among recent location positioning systems which specifies the locations of radio communication terminal units, e.g., cellular phone units, there is a system which operates based on the IS (Interim Standard) protocol. In this system, a cellular phone unit receives base station identification numbers (base-IDs) from several base stations, designates one of these base stations to be its communication base station, and sends the base-ID of the designated base station to a location information server.

The location information server, upon receiving the base-ID from the cellular phone unit, determines the approximate location of the telephone unit based on the received base-ID and sends assist information useful for the telephone unit to make access to GPS (Global Positioning System) satellites. The cellular phone unit, upon receiving the assist information from the location information server, makes access to GPS satellites based on the received assist information. This system is advantageous for each cellular phone unit to reduce its operation by making access to GPS satellites based on the assist information provided by the location information server, and also advantageous for minimizing the time expended before the commencement of the location positioning operation.

In the portable mobile telephone system of the CDMA (Code Division Multiple Access) scheme, it is stated in ARIB STD-T53 to enable cellular phone units to receive base-IDs from base stations through the paging channel. However, it is not stated to enable the reception of base-IDs through the traffic channel, and therefore the following problem arises.

When a cellular phone unit is instructed by the user to commence the data communication, the radio communication device of the telephone unit turns from the standby mode to the data communication mode and links to a contents server, for example, so that the telephone unit can commence the data communication. If the telephone unit is subsequently instructed by the user to commence the location positioning, it cannot receive the base-ID from the base station through the traffic channel and therefore it sends the base-ID, which has been received through the paging channel during the standby mode of the radio communication device before turning to the data communication mode, to a location information server.

Figure 10A:
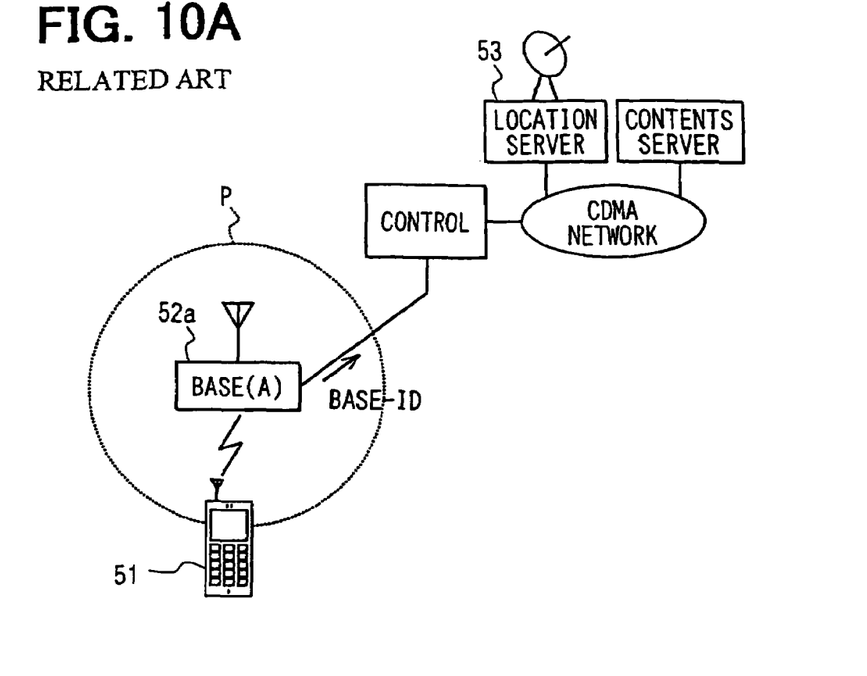
FIGS. 10A and 10B are block diagrams showing a radio communication system according to a related art.

Specifically, in one case, as shown in FIG. 10A, when a cellular phone unit 51 is instructed by the user to commence the data communication and instructed to commence the location positioning almost at the same time, it sends to a location information server 53 the base-ID of a base station 52a which is the proper base station of primary communication with it.

Figure 10B:
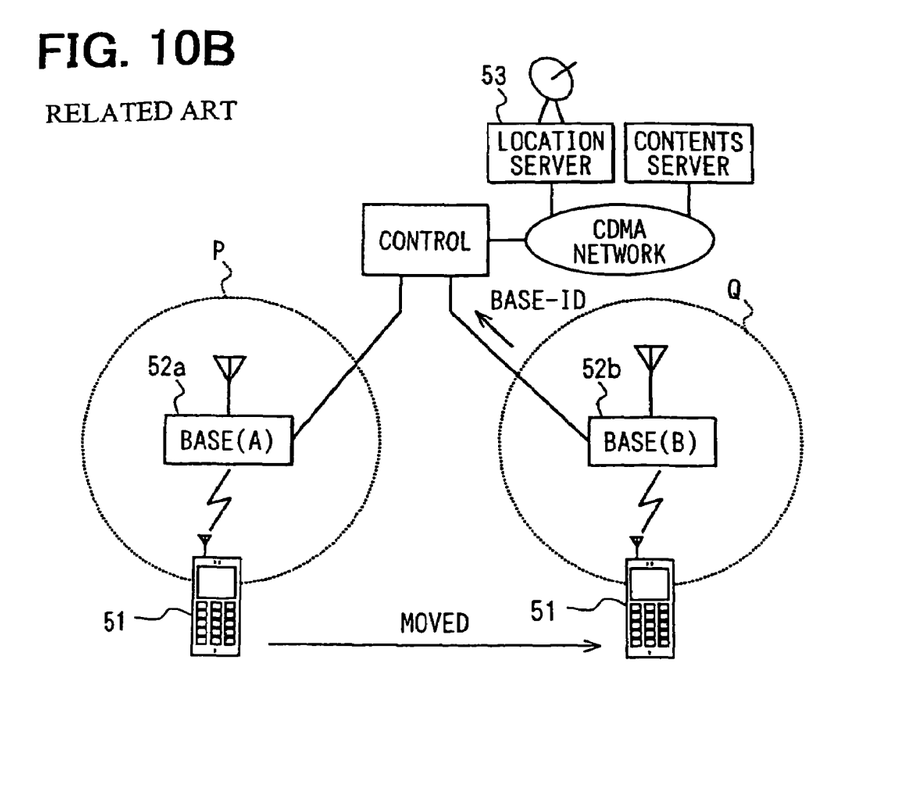

In another case, as shown in FIG. 10B, when the cellular phone unit 51 at one location within the area (shown by dotted circle P) of the base station 52a is instructed by the user to commence the data communication, moves to another location within the area (shown by dotted circle Q) of another base station 52b, and is instructed to commence the location positioning at the new location, it cannot send the base-ID of the proper base station 52b to the location information server 53, but sends the base-ID of the improper base station 52a which is the former communication base station before the movement. In consequence, the location information server 53 receives the base-ID of the improper base station 52a of the area where the telephone unit 51 is not present currently, instead of receiving the base-ID of the proper base station 52b of the area where the telephone unit 51 is present currently. It cannot determine the approximate location of the telephone unit 51 properly and sends improper assist information to the telephone unit 51. The telephone unit 51, upon receiving the improper assist information from the location information server 53, cannot make access to proper GPS satellites and thus cannot determine its location accurately.

SUMMARY OF THE INVENTION

In view of the foregoing situation, it is an object of the present invention to provide a radio communication terminal unit which is capable of sending a proper base station ID number to the location information server so that the terminal unit can determine its location accurately, and a method of transmitting a base station ID number from the terminal unit to the location information server.

A radio communication terminal unit responds to a user's instruction of location positioning to turn from a data communication mode to a dormant mode, upon turning from a standby mode to a data communication mode. It receives again base station identification numbers from several base stations through a paging channel, and designates again one of the base stations with the received identification numbers as the base station of primary communication with the terminal unit. The phone unit can send the identification number of the proper base station of primary communication to a location information server even in case the phone unit is instructed by the user to commence the location positioning after it has moved from the location where it had commenced the data communication.

DETAILED DESCRIPTION OF THE PREFERRED EMBODIMENTS

First Embodiment

Figure 1:
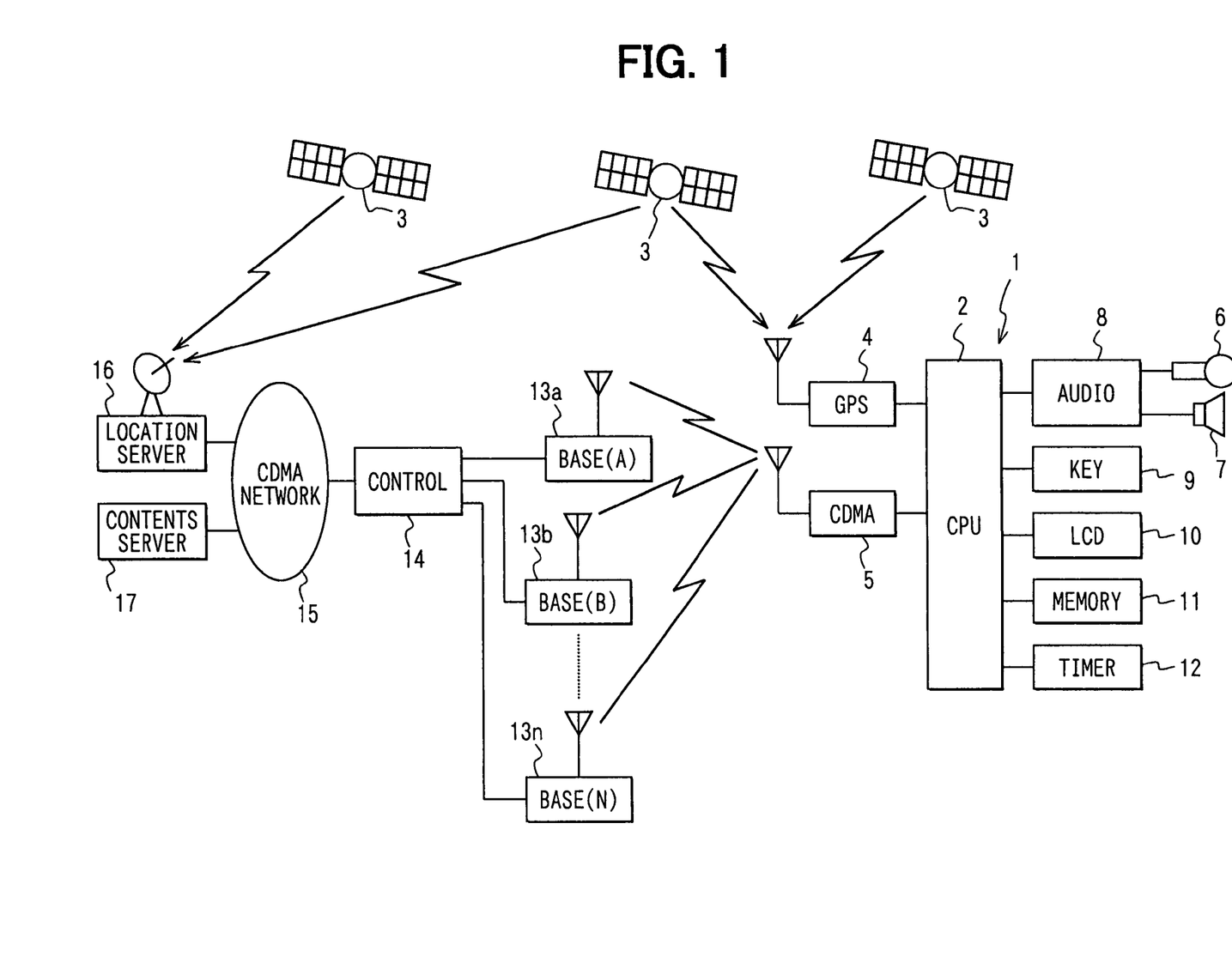
FIG. 1 is a block diagram showing a radio communication system of a cellular phone unit of a first embodiment of this invention.
Figure 2A:
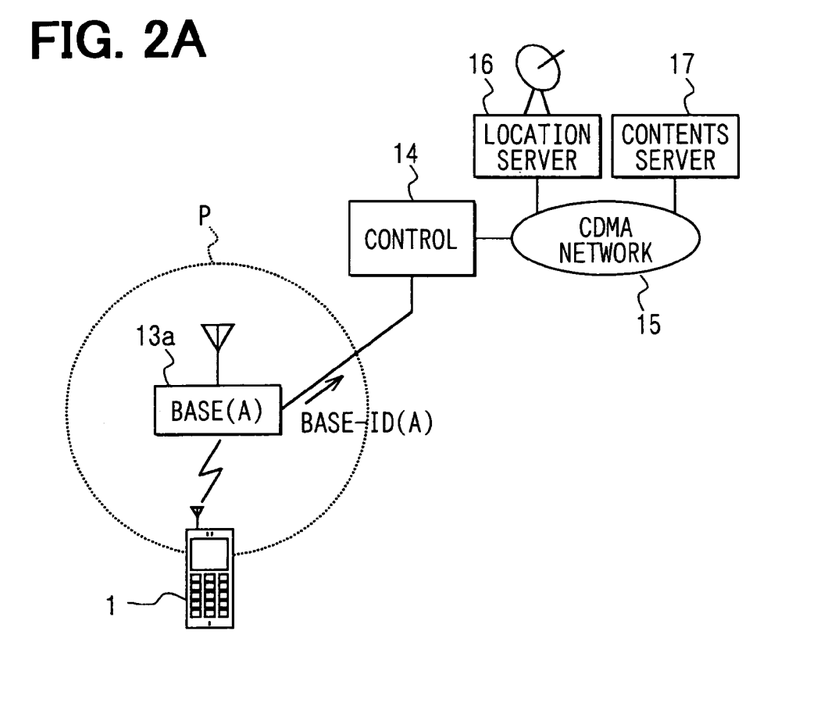
FIGS. 2A and 2B are diagrams showing the radio communication system based on the first embodiment.
Figure 2B:
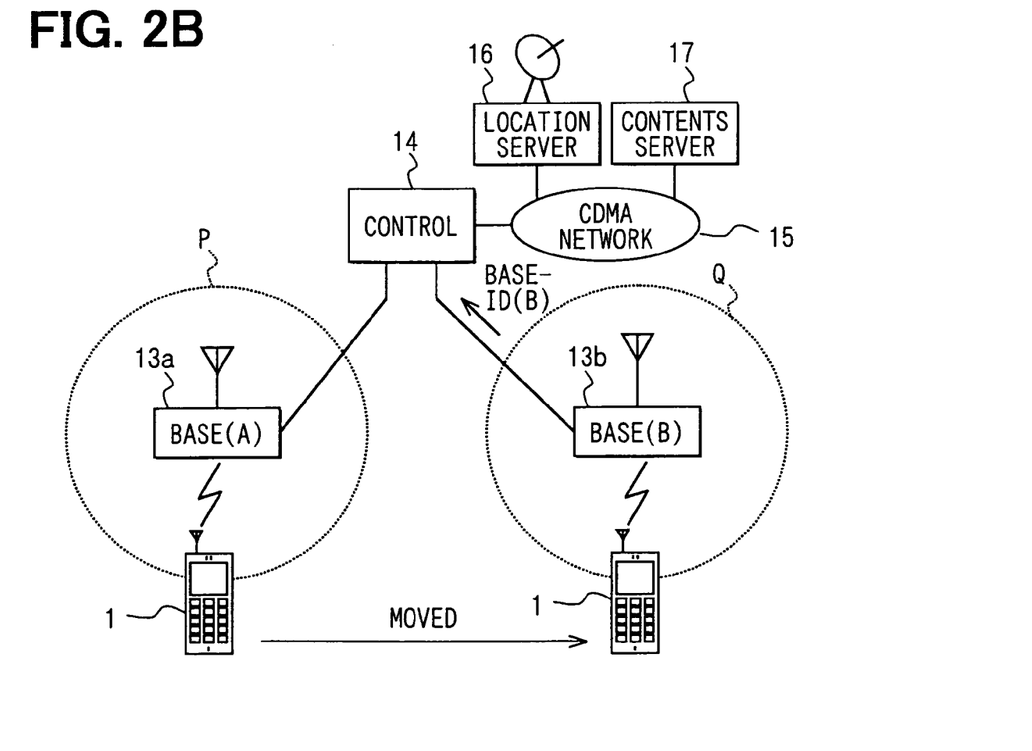
Figure 3:
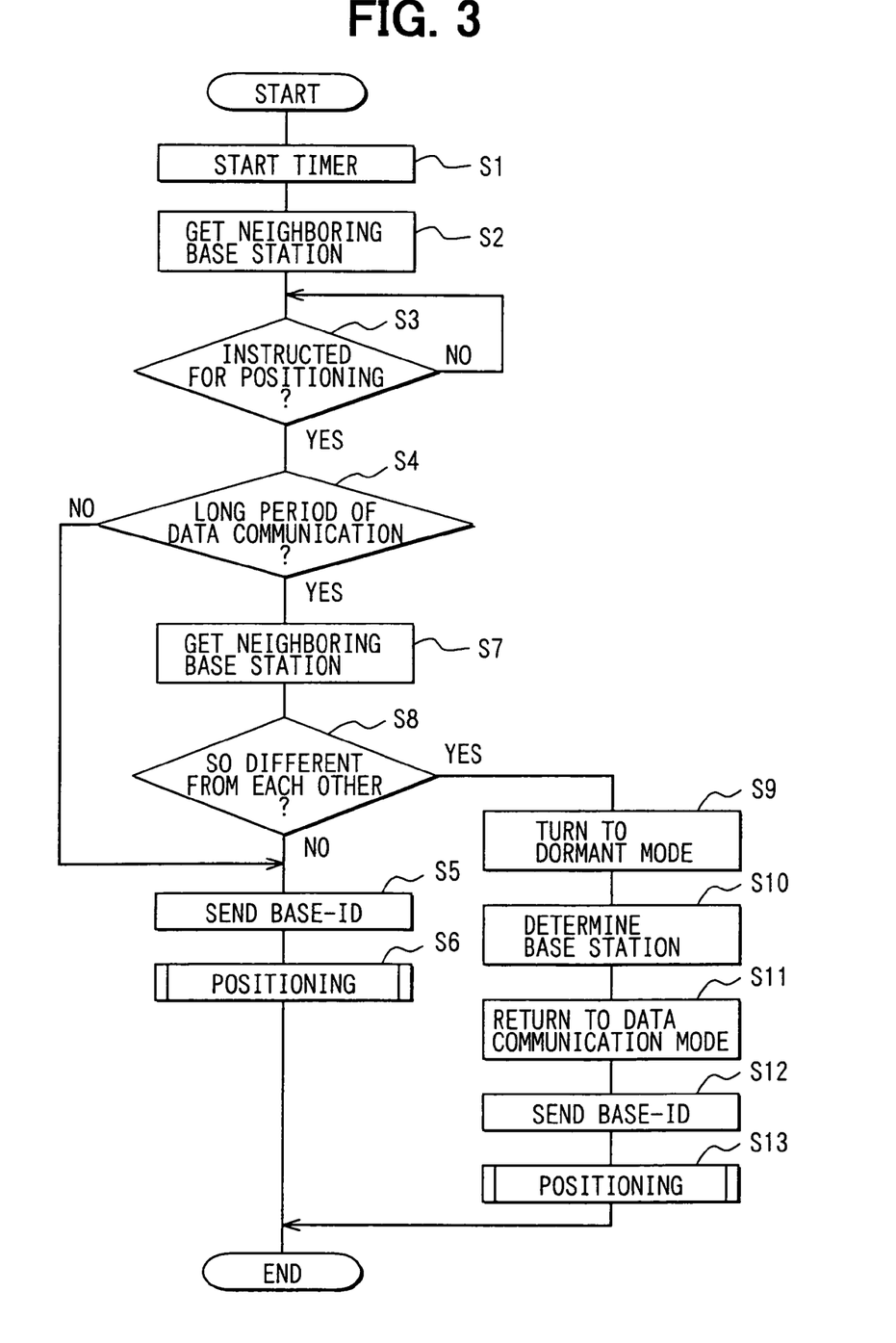
FIG. 3 is a flowchart showing the operation of the cellular phone unit of the first embodiment.

A radio communication terminal of the first embodiment of this invention is applied to a cellular phone unit as shown in FIG. 1 through FIG. 3.

In FIG. 1, a cellular phone unit 1 includes a CPU (Central Processing Unit) 2 having functions of microprocessor, to which are connected a GPS (Global Positioning System) communication device 4 which makes access and transacts the GPS radio wave signals with GPS satellites 3, a CDMA (Code Division Multiple Access) communication device 5 which implements the telephone operations based on the CDMA scheme, an audio processor 8 which deals with a voice signal entered by a microphone 6 and a voice signal to be released by a speaker 7, a key panel 9 including a communication start key, communication end key and numeric keys, a liquid crystal display panel 10 which displays the date and time and telephone number, a memory 11 including RAM (Random Access Memory) and ROM (Read Only Memory), and a timer 12.

In this system, the cellular phone unit 1 is instructed by the user on its key panel 9 to commence the location positioning. It receives base station identification numbers (base-IDs) from several base stations 13 (13a through 13n), designates one of the base stations with the received base-IDs to be its communication base station based on the reception signal power level or the like, and sends the base-ID of the designated base station 13 to a location information server 16 via the base station 13, a base station control facility 14 and CDMA telephone network 15.

The location information server 16, upon receiving the base-ID from the cellular phone unit 1, determines the approximate location of the telephone unit 1 based on the received base-ID and sends assist information useful for the telephone unit 1 to make access to GPS satellites 3 via the CDMA telephone network 15, base station control facility 14 and base station 13. The cellular phone unit 1, upon receiving the assist information from the location information server 16, makes access to GPS satellites 3 based on the received assist information.

A contents server 17 sends contents data of application programs, e.g., games and map display, to the cellular phone unit 1 via the CDMA telephone network 15, base station control facility 14 and base station 13. By receiving contents data from the contents server 17, the telephone unit 1 runs the application program by using the received contents data so that a game picture or map is displayed on the display panel 10.

The cellular phone unit 1 can receive base-IDs from base stations 13 through the paging channel by its CDMA communication device 5 when the device 5 is in the standby mode or dormant mode. However, it cannot receive base-IDs through the traffic channel when the CDMA communication device 5 is in the data communication mode. The dormant mode is a state of the cellular phone unit 1, in which the calling control is suspended temporarily after the commencement of and during the data communication with the location information server 16. This mode enables the telephone unit 1 to receive base-IDs from base stations 13 through the paging channel by its CDMA communication device 5.

Next, the system operation will be explained with reference to FIGS. 2A, 2B and 3.

In the first case shown in FIG. 2A, where the cellular phone unit 1 is located within the area (shown by dotted circle P) of the base station 13a, the CPU 2 operates on the CDMA communication device 5 in the standby mode to receive base-IDs of base stations 13 through the paging channel and designates the base station 13a as communication base station from among the base stations with the received base-IDs.

When the telephone unit 1 is instructed by the user to commence the data communication, the CPU 2 operates on the CDMA communication device 5 to turn from the standby mode to the data communication mode thereby to have a data communication with the contents server 17. Following the commencement of data communication by the CDMA communication device 5 in data communication mode, the CPU 2 proceeds to the sequential operation shown in the flowchart of FIG. 3.

Specifically, the CPU 2 starts the timer 12 (step S1), and gets information of neighboring base stations 13 of the base station 13a of primary communication with the telephone unit 1 (step S2).

In the second case shown in FIG. 2B, where the cellular phone unit 1 moves from the area of the base station 13a into the area (shown by dotted circle Q) of another base station 13b and is next instructed by the user to commence the location positioning (YES at step S3), the CPU 2 checks the time count of the timer 12 thereby to adjust as to whether or not a prescribed time length has expired after the CDMA communication device 5 has turned from the standby mode to the data communication mode (step S4). The above-mentioned time length is determined based on statistic data of user operation (time length after the instruction of the commencement of data communication until the instruction of the commencement of location positioning) and the distribution (density) of base stations 13, for example.

If the CPU 2 detects that the prescribed time length has not yet expired after the CDMA communication device 5 has turned from the standby mode to the data communication mode (NO at step S4), it operates on the CDMA communication device 5 to send the base-ID of the base station 13a, which has been designated to be the communication base station in the former standby mode before switching to the data communication mode, to the location information server 16 (step S5), and thereafter proceeds to the location positioning operation performed in cooperation with the location information server 16 (step S6). This is the case where the cellular phone unit 1, which has instructed to commence the data communication in the area of base station 13a, is still present within the area of base station 13a at the time of reception of user's instruction of the commencement of location positioning, and the telephone unit 1 proceeds to the location positioning operation by sending the base-ID of the base station 13a of the area where the telephone unit 1 has been located at the reception of user's instruction of data communication.

Otherwise, if the CPU 2 detects that the prescribed time length has expired after the CDMA communication device 5 has turned from the standby mode to the data communication mode (YES at step S4), it operates to get information of neighboring base stations again (step S7). This is the case where the cellular phone unit 1 is performing data communication with the base station 13b in place of the base station 13a. The CPU 2 gets information of base stations that neighbor on the base station 13b.

The CPU 2 compares between the neighboring base station information obtained in step S2 and the neighboring base station information obtained in step S7 thereby to determine as to whether or not the difference in terms of the number of base stations is greater than a prescribed number of stations (step S8). The prescribed number of base stations is determined based on the distribution (density) of base stations 13, for example. If the CPU 2 detects that the difference is less than the prescribed number of stations (NO at step S8), it proceeds to the operations of steps S5 and S6 explained previously. This is the case where the telephone unit 1 is instructed by the user to commence the location positioning after the prescribed time length has expired following the instruction of the commencement of data communication, i.e., the cellular phone unit 1 is determined to be still within the same area of the base station 13a as it has been present at the reception of user's instruction of data communication. It sends to the location information server 16 the base-ID of the base station 13a of the area where the telephone unit 1 has been present at the reception of the user's instruction of the commencement of data communication and proceeds to the location positioning operation.

Otherwise, if the CPU 2 detects that the difference is in excess of the prescribed number of stations (YES at step S8), it turns the CDMA communication device 5 from the data communication mode to the dormant mode (step S9), operates on the CDMA communication device 5 to receive again base-IDs from several base stations 13 through the paging channel, and designates again the base station 13b as communication base station (step S10). This is the case where the telephone unit 1 is instructed by the user to commence the location positioning after the expiration of the prescribed time length following the user's instruction of the commencement of data communication, i.e., the cellular phone unit 1 is determined to be outside the area of the base station 13a where it has been located at the reception of user's instruction of data communication.

The CPU 2 operates on the CDMA communication device 5 to restore the data communication mode from the dormant mode (step S11), and then send to the location information server 16 the base-ID of the base station 13b which has been designated to be the communication base station in the dormant mode before the restoration of data communication mode (step S12). Thereafter it precedes to the location positioning operation performed in cooperation with the location information server 16 (step S13).

According to the foregoing first embodiment, when the cellular phone unit 1 has its CDMA communication device 5 turning from the standby mode to the data communication mode and thereafter receives the user's instruction of location positioning, it operates on the CDMA communication device 5 to turn from the data communication mode to the dormant mode and receive again base-IDs of several base stations 13 through the paging channel, designates again one of the base stations 13 to be communication base station, and sends the base-ID of the designated base station to the location information server 16, whereby even in case the telephone unit 1 moves from the location where it has been instructed by the user to commence the data communication and is next instructed to commence the location positioning at a new location, the CDMA communication device 5 turns from the data communication mode to the dormant mode to receive again base-IDs of several base stations 13 through the paging channel and the telephone unit 1 can send the base-ID of the proper base station of primary communication with the telephone unit 1 to the location information server 16.

The location information server 16, upon receiving the base-ID of the proper base station from the cellular phone unit 1, determines the approximate location of the telephone unit 1 based on the received base-ID and sends proper assist information to the telephone unit 1. The telephone unit 1 receives the assist information from the location information server 16 and makes access to proper GPS satellites based on the received assist information. In consequence, the cellular phone unit 1 can determine its location accurately and reliably.

By setting an optimal time interval of instruction reception based on statistic data of user operation or the distribution of base stations 13 for example, or by setting an optimal number of base stations for base station information based on the distribution of base stations 13 for example, the cellular phone unit 1 can be controlled appropriately.

Second Embodiment

Figure 4:
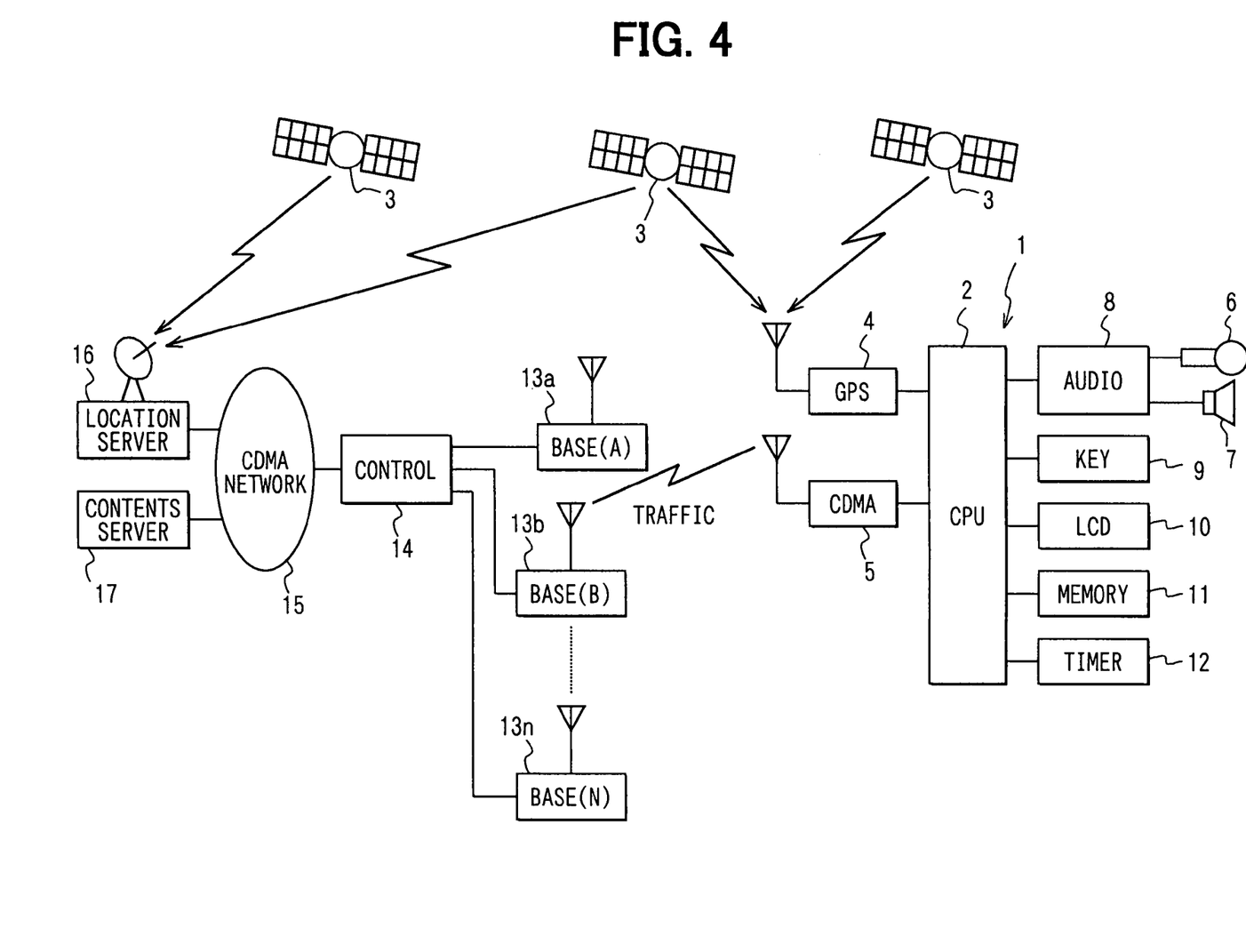
FIG. 4 is a block diagram showing a radio communication system of a cellular phone unit of a second embodiment of this invention.
Figure 5:
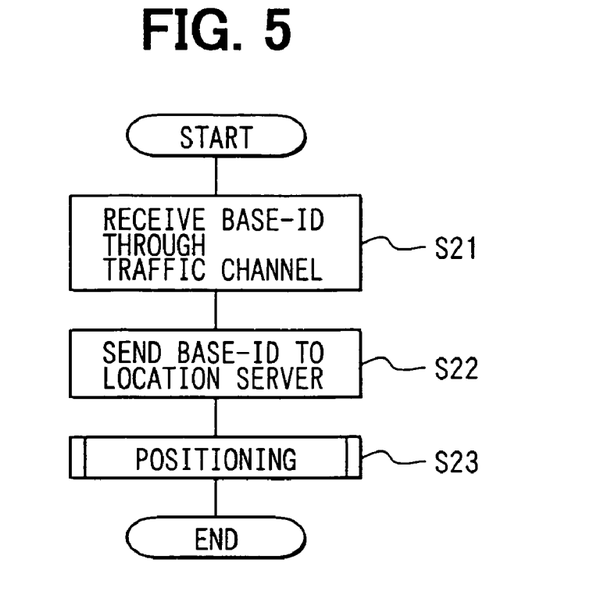
FIG. 5 is a flowchart showing the operation of cellular phone unit of the second embodiment.

The second embodiment of this invention will be explained with reference to FIGS. 4 and 5.

The cellular phone unit 1 of this embodiment is not only capable of receiving base-IDs from base stations 13 through the paging channel after the CDMA communication device 5 has turned to the standby mode or dormant mode, but it is designed to be capable of receiving base-IDs from base stations 13 through the traffic channel even after the CDMA communication device 5 has turned to the data communication mode.

When the CPU 2 detects the user's instruction of the commencement of data communication, it operates on the CDMA communication device 5 to turn from the standby mode to the data communication mode. Upon subsequently detecting the instruction of the commencement of location positioning, it operates on the CDMA communication device 5 to receive the base-ID from the primary communication base station 13 through the traffic channel while retaining the data communication mode, in contrast to the first embodiment in which the communication device 5 is switched from the data communication mode to the dormant mode (step S21). The CPU 2 operates on the CDMA communication device 5 to send the received base-ID to the location information server 16 (step S22), and thereafter proceeds to the location positioning operation performed in cooperation with the location information server 16 (step S23).

According to the second embodiment, when the cellular phone unit 1 has its CDMA communication device 5 turning from the standby mode to the data communication mode and thereafter receives the user's instruction of location positioning, it operates on the CDMA communication device 5 to receive the base-ID from the primary communication base station 13 through the traffic channel and send to the location information server 16. Thus, even in case the telephone unit 1 moves from the location where it has been instructed by the user to commence the data communication and is next instructed to commence the location positioning at a new location, it can send the base-ID of the proper base station of primary communication with it to the location information server 16 as in the case of the first embodiment. In consequence, the cellular phone unit 1 can determine its location accurately and reliably.

Third Embodiment

Figure 6:
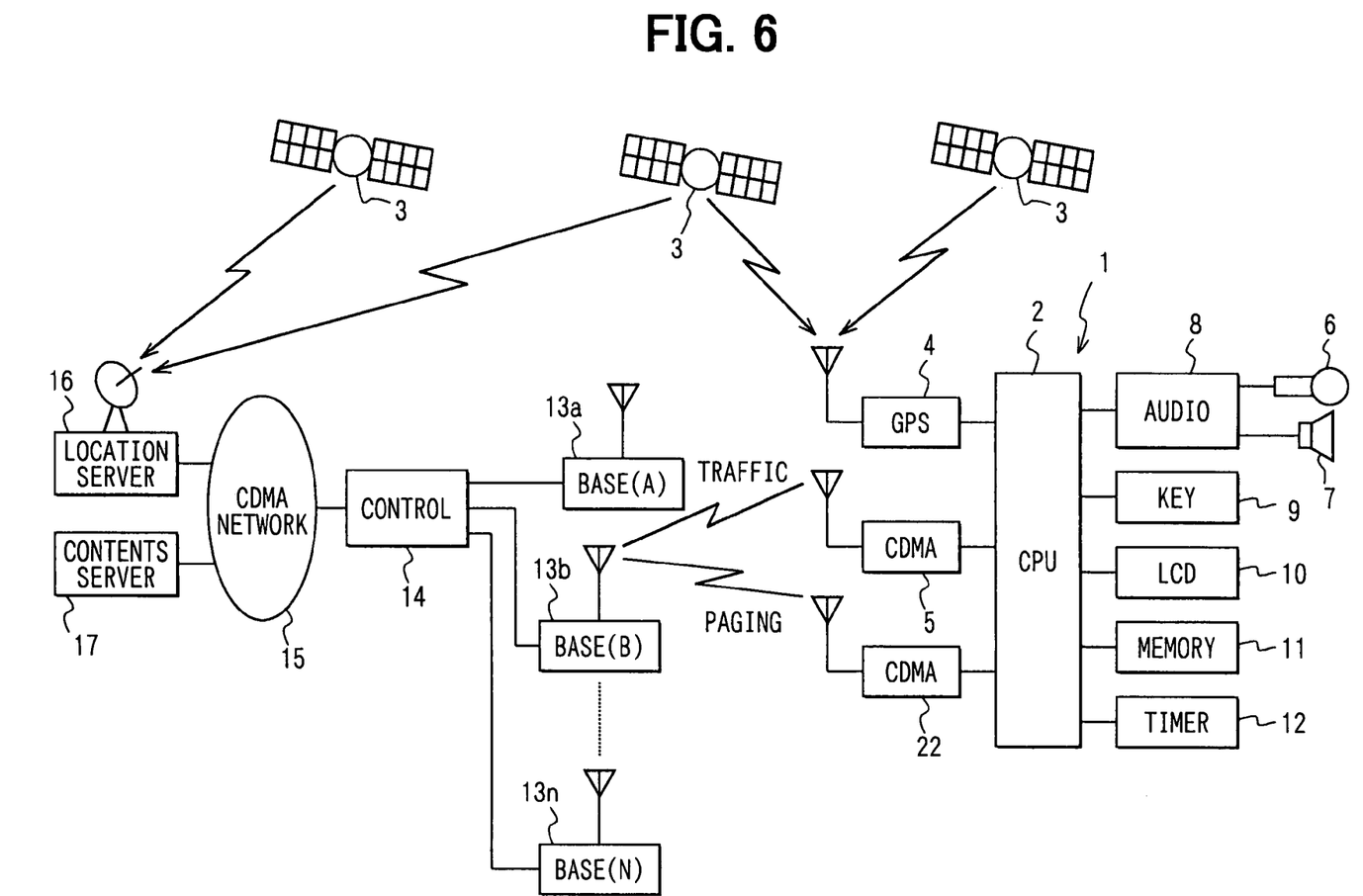
FIG. 6 is a block diagram showing a radio communication system of a cellular phone unit of a third embodiment of this invention.
Figure 7:
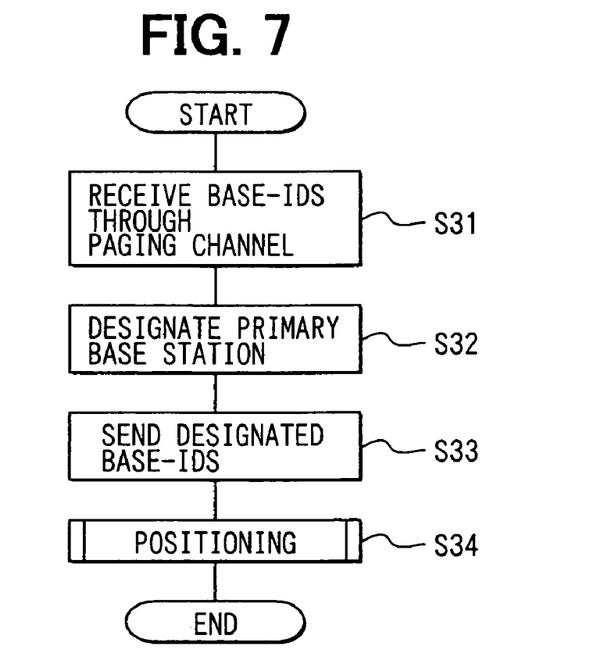
FIG. 7 is a flowchart showing the operation of cellular phone unit of the third embodiment.

The third embodiment of this invention will be explained with reference to FIGS. 6 and 7.

The cellular phone unit 21 of this embodiment has another CDMA communication device 22 in addition to the CDMA communication device 5. Thus, during the data communication by the CDMA communication device 5, the CDMA communication device 22 is turned to the standby mode so as to be capable of receiving base-IDs from base stations 13 through the paging channel.

When the CPU 2 detects the user's instruction of the commencement of data communication, it operates on the CDMA communication device 5 to turn from the standby mode to the data communication mode. Upon subsequently detecting the instruction of the commencement of location positioning, it operates on the CDMA communication device 22 to receive again base-IDs from several base stations 13 through the paging channel while retaining the data communication mode of the CDMA communication device 5, in contrast to the first embodiment in which the communication device 5 is switched from the data communication mode to the dormant mode (step S31). It designates again one of the base stations with the received base-IDs as a primary communication base station (step S32). The CPU 2 operates on the CDMA communication device 22 to send the base-ID of designated base station to the location information server 16: (step S33), and thereafter proceeds to the location positioning operation performed in cooperation with the location information server 16 (step S34).

According to the third embodiment, the cellular phone unit 21 is provided with the additional CDMA communication device 22. When the telephone unit 21 receives the user's instruction of location positioning after the CDMA communication device 5 has turned from the standby mode to the data communication mode, it operates on the CDMA communication device 22 to receive again base-IDs from several base stations 13 through the paging channel, designates again one of the base stations with the received base-IDs as primary communication base station, and sends the base-ID of the designated base station to the location information server 16. Thus, even in case the telephone unit 21 moves from the location where it has been instructed by the user to commence the data communication and is next instructed to commence the location positioning at a new location, it can receive again base-IDs from base stations through the paging channel by use of the additional CDMA communication device 22 and can send the base-ID of the proper base station of primary communication to the location information server 16 as in the case of the first embodiment. In consequence, the cellular phone unit 21 can determine its location accurately and reliably.

Fourth Embodiment

Figure 8:
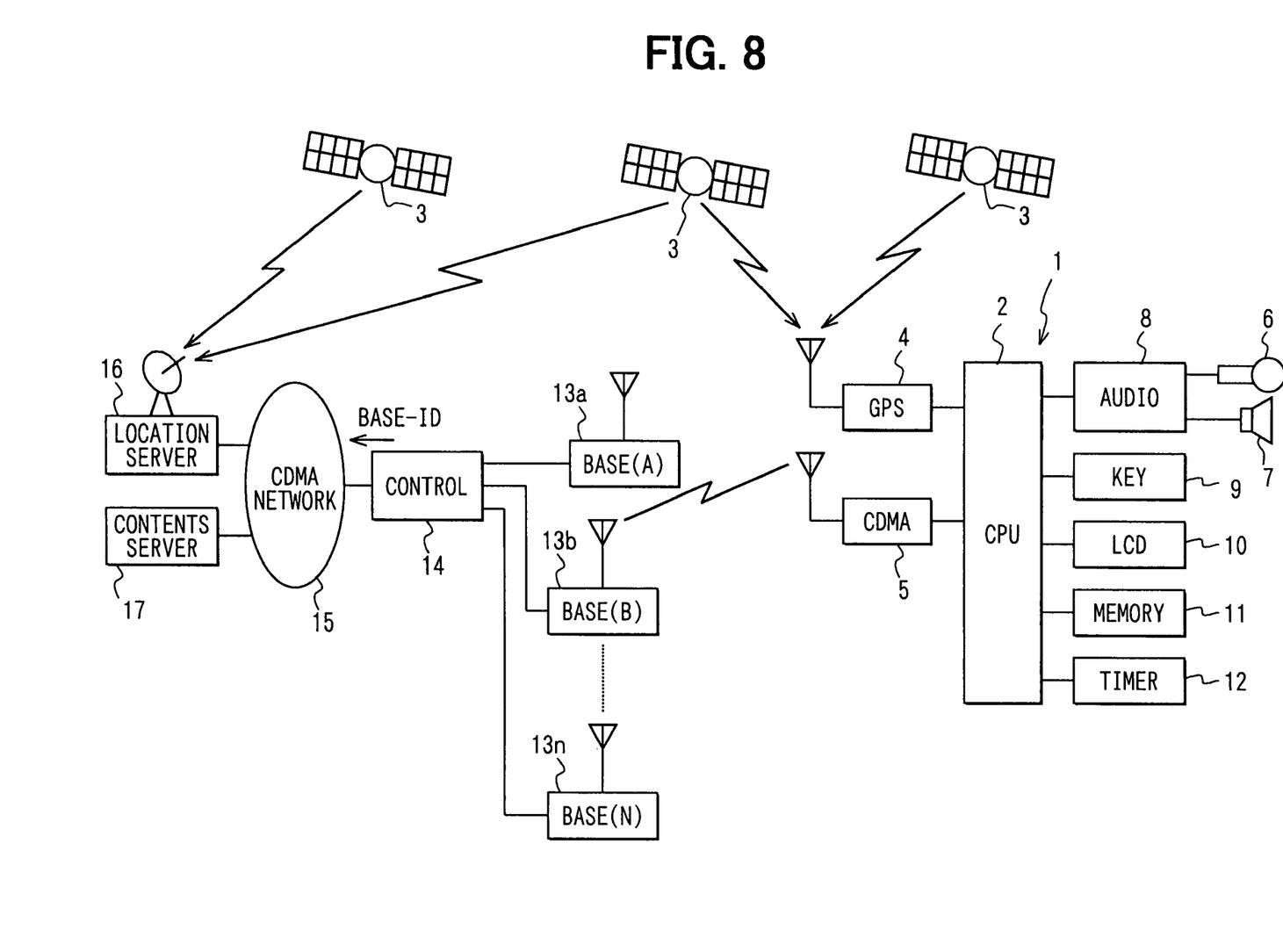
FIG. 8 is a block diagram showing a radio communication system of a cellular phone unit of a fourth embodiment of this invention.
Figure 9:
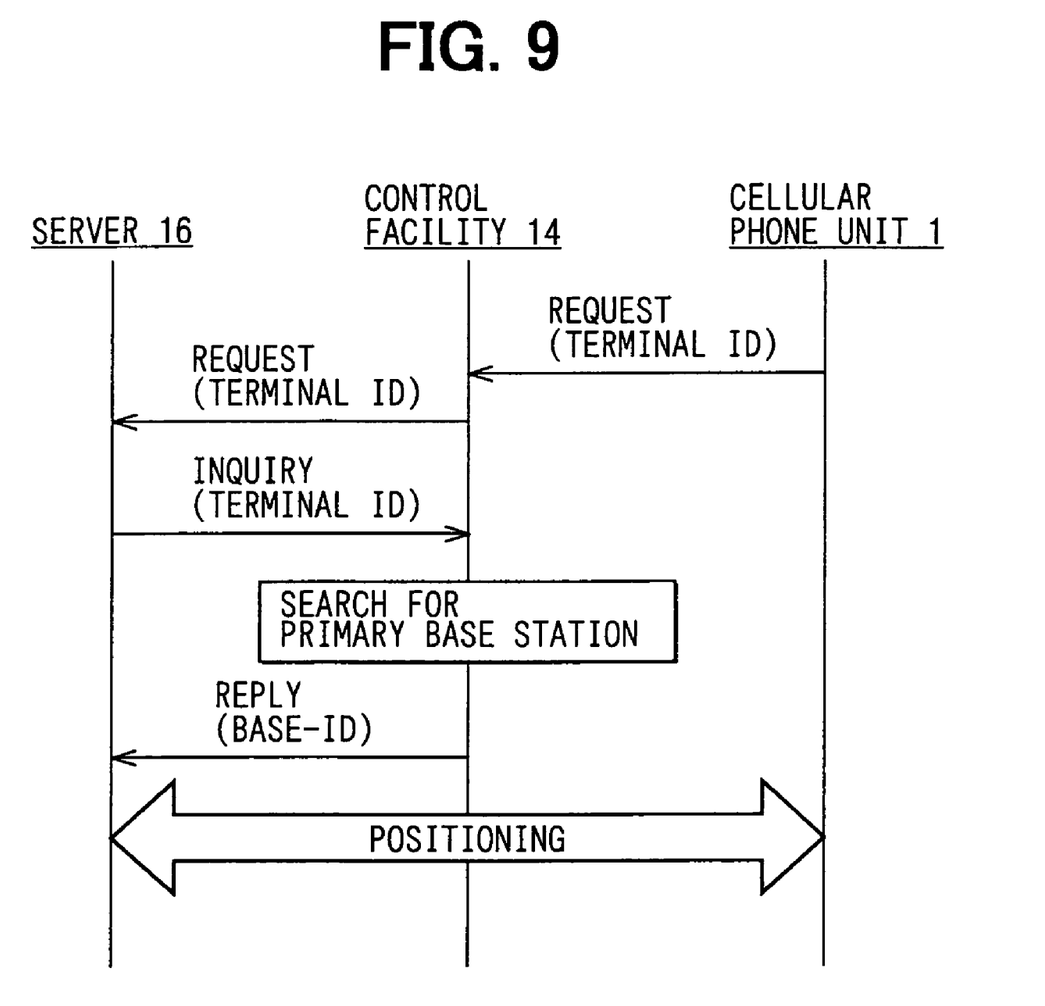
FIG. 9 is a diagram showing the sequential operations of the system.

The fourth embodiment of this invention will be explained with reference to FIGS. 8 and 9.

In the radio communication system, the location information server 16 receives a request message of location positioning from the cellular phone unit 1, and the server 16 responds to the message to send an inquiry message to the base station control facility 14. The control facility 14, upon receiving the inquiry message from the location information server 16, makes access to the base station 13 which is the base station of primary communication with the telephone unit 1 and sends a reply message to the location information server 16.

When the cellular phone unit 1 is instructed by the user to commence the location positioning, it sends a location positioning request message inclusive of its terminal ID number (e.g., telephone number) to the base station control facility 14. The control facility 14, upon receiving the request message from the telephone unit 1, sends the received message to the location information server 16. The location information server 16, upon receiving the message from the base station control facility 14, analyzes the terminal ID number and sends an inquiry message inclusive of the terminal ID number to the base station control facility 14.

The base station control facility 14, upon receiving the inquiry message from the location information server 16, analyzes the terminal ID number included in the received message, makes access to the base station 13 of primary communication with the telephone unit 1 having the terminal ID number and sends a reply message inclusive of the base-ID of the primary communication base station 13 to the location information server 16. The cellular phone unit 1 thereafter proceeds to the location positioning operation performed in cooperation with the location information server 16.

According to the fourth embodiment, even in case the telephone unit 1 moves from the location where it has been instructed by the user to commence the data communication and is next instructed to commence the location positioning at a new location, the base station control facility 14 can send the base-ID of the proper base station 13 of primary communication to the location information server 16. In consequence, the cellular phone unit 1 can determine its location accurately and reliably.

(Modifications)

The present invention is not confined to the foregoing embodiments, but the following modifications are possible.

The radio communication terminal unit can be a portable information terminal unit or other communication terminal unit, other than a cellular phone unit.

The prescribed time length and prescribed number of stations in the first embodiment may be determined by the system so as to be optimal based on the provision of a learning function or may be set by the user arbitrarily.

The computer program which is run by the CPU of the cellular phone unit may be down-loaded from a certain server via the telephone network or may be transferred from a CD-ROM (Compact Disk Read Only Memory) or magnetic card into the memory of telephone unit, besides the provision in a ROM at the manufacturing of telephone unit.

What is claimed is:

1. A method for sending an assist information to a terminal unit so that the terminal unit measures its location based on the assist information in a system including the terminal unit, a location information server, a plurality of base stations, and a base station control facility, the terminal unit including radio communication means which receives base station identification numbers from base stations through a paging channel and control means which designates one of the base stations with the received identification numbers as a base station of primary communication, the method comprising steps of:

at the location information server, receiving a terminal unit identification number of the terminal unit from the terminal unit;

at the location information server, sending the terminal unit identification number, which is received from the terminal unit, to the base station control facility;

at the base station control facility, determining one of the base stations which communicates with the terminal unit based on the terminal unit identification number which is received from the location information server;

at the base station control facility, sending the base station identification number representing the base station which communicates with the terminal unit to the location information server;

at the location information server, determining the assist information in accordance with the base station identification number, wherein the assist information is used to receive GPS satellite signals only from certain GPS satellites at the terminal unit;

at the location information server, transmitting the assist information to the terminal unit so that the terminal unit can receive GPS satellite signals only from the GPS satellites based on the assist information; and at the control means, upon receiving an instruction of location positioning after the radio communication means has turned from a standby mode to a data communication mode, operating on the radio communication means to turn from the data communication mode to a dormant mode and receive again base station identification numbers from the base stations through the paging channel, designating again one of the base stations with the received identification numbers as the base station of primary communication, and operating on the radio communication means to send the base station identification number of the designated base station to the location information server.

2. A method according to claim 1, wherein the terminal unit receives the assist information from the location information server in order to determine the location of the terminal unit.

3. A method according to claim 2, wherein the terminal unit makes access to the GPS satellites upon receiving the assist information.

4. A method according to claim 1, wherein the base station control facility, upon receiving an inquiry message from the location information server, makes access to the base station and sends a reply message to the location information server.

* * * * *